United States Patent
Winokur

(12) 
(10) Patent No.: US 11,055,183 B2
(45) Date of Patent: Jul. 6, 2021

(54) DATA GAP MANAGEMENT IN A REMOTE DATA MIRRORING SYSTEM

(71) Applicant: Axxana (Israel) Ltd., Tel Aviv (IL)

(72) Inventor: Alex Winokur, Haifa (IL)

(73) Assignee: AXXANA (ISRAEL) LTD., Tel Aviv (IL)

( * ) Notice: Subject to any disclaimer, the term of this patent is extended or adjusted under 35 U.S.C. 154(b) by 753 days.

(21) Appl. No.: 15/261,952

(22) Filed: Sep. 11, 2016

(65) Prior Publication Data

US 2016/0378617 A1 Dec. 29, 2016

Related U.S. Application Data

(63) Continuation of application No. 13/382,926, filed as application No. PCT/IB2010/053427 on Jul. 28, 2010, now abandoned.

(Continued)

(51) Int. Cl.
*G06F 12/08* (2016.01)
*G06F 12/0808* (2016.01)
(Continued)

(52) U.S. Cl.
CPC ......... *G06F 11/1471* (2013.01); *G06F 3/065* (2013.01); *G06F 3/067* (2013.01);
(Continued)

(58) Field of Classification Search
CPC .. G06F 3/0484; G06F 17/243; G06F 17/3028; G06F 11/2069; G06F 11/2076; G06F 12/0802; G06F 12/0808
(Continued)

(56) References Cited

U.S. PATENT DOCUMENTS 6,574,705 B1 * 6/2003 Peloquin ............... G06F 3/0601
707/999.202
6,782,410 B1 * 8/2004 Bhagat ................... G06F 9/5027
709/201

(Continued)

FOREIGN PATENT DOCUMENTS

IL    WO 2006111958 A2 * 10/2006   .......... G06F 11/2074

OTHER PUBLICATIONS

U.S. Appl. No. 14/916,190 office action dated Dec. 16, 2019.
U.S. Appl. No. 15/169,811 office action dated Oct. 17, 2018.

*Primary Examiner* — Mohamed M Gebril
(74) *Attorney, Agent, or Firm* — Kligler & Associates Patent Attorneys Ltd

(57) ABSTRACT

A method includes monitoring a sequence of transactions in one or more volumes. The transactions are transferred to a primary storage (112) in a given order, and are replicated to a secondary storage (114). The volumes belong to a volume group (204) for which the transactions are guaranteed to be replicated while retaining the given order. Artificial write transactions (228) are periodically issued to a protection application field, which is predefined in a given volume (212) belonging to the volume group. Records indicative of the transactions, including the artificial transactions, are stored in a disaster-proof storage unit (144). Upon verifying that a given artificial transaction has been successfully replicated in the secondary storage, the records corresponding to the given artificial write transaction and the transactions that precede it in the sequence are deleted from the disaster-proof storage unit.

18 Claims, 4 Drawing Sheets

Related U.S. Application Data

(60) Provisional application No. 61/231,025, filed on Aug. 4, 2009.

(51) Int. Cl.
*G06F 12/0815* (2016.01)
*G06F 11/14* (2006.01)
*G06F 11/20* (2006.01)
*G06F 3/06* (2006.01)

(52) U.S. Cl.
CPC ........ *G06F 3/0619* (2013.01); *G06F 11/1474* (2013.01); *G06F 11/2058* (2013.01); *G06F 11/2074* (2013.01); *G06F 2201/805* (2013.01); *G06F 2201/82* (2013.01); *G06F 2201/835* (2013.01)

(58) Field of Classification Search
USPC .......................................................... 711/162
See application file for complete search history.

(56) References Cited

U.S. PATENT DOCUMENTS

| | | | |
|---|---|---|---|
| 6,842,377 B2* | 1/2005 | Takano | G11C 7/1021 365/185.21 |
| 7,017,011 B2* | 3/2006 | Lesmanne | G06F 12/082 711/141 |
| 7,196,942 B2* | 3/2007 | Khurana | G11C 7/1051 326/38 |
| 7,269,715 B2* | 9/2007 | Le | G06F 9/3802 712/215 |
| 7,293,154 B1 | 11/2007 | Karr et al. | |
| 7,321,955 B2* | 1/2008 | Ohmura | G06F 12/0804 711/113 |
| 7,512,736 B1* | 3/2009 | Overby | G06F 3/0607 707/999.202 |
| 7,523,149 B1 | 4/2009 | Sridharan et al. | |
| 7,657,578 B1* | 2/2010 | Karr | G06F 11/2069 707/610 |
| 8,230,193 B2* | 7/2012 | Klemm | G06F 3/0608 711/114 |
| 8,285,835 B1 | 10/2012 | Deolasee et al. | |
| 8,347,010 B1* | 1/2013 | Radovanovic | G06F 13/38 710/2 |
| 8,443,166 B2* | 5/2013 | Czezatke | G06F 11/1451 711/203 |
| 8,566,546 B1* | 10/2013 | Marshak | G06F 3/0604 711/112 |
| 8,762,341 B1 | 6/2014 | Mahajan et al. | |
| 8,984,031 B1* | 3/2015 | Todd | G06F 17/30091 707/823 |
| 8,990,527 B1* | 3/2015 | Linstead | G06F 3/0617 711/161 |
| 2001/0044795 A1 | 11/2001 | Cohen | |
| 2002/0103816 A1 | 8/2002 | Ganesh et al. | |
| 2003/0037034 A1 | 2/2003 | Daniels et al. | |
| 2003/0187861 A1* | 10/2003 | Lubbers | G06F 3/0601 |
| 2004/0068621 A1* | 4/2004 | Van Doren | G06F 12/0828 711/144 |
| 2004/0078637 A1* | 4/2004 | Fellin | G06F 11/1443 714/6.3 |
| 2005/0055357 A1 | 3/2005 | Campbell | |
| 2005/0125607 A1* | 6/2005 | Chefalas | G06F 12/0862 711/113 |
| 2005/0262170 A1 | 11/2005 | Girkar et al. | |
| 2005/0273565 A1* | 12/2005 | Hirakawa | G06F 11/2058 711/162 |
| 2007/0008328 A1* | 1/2007 | MacWilliams | G06F 12/0646 345/530 |
| 2007/0025175 A1* | 2/2007 | Liu | G11C 7/1012 365/233.11 |
| 2007/0061379 A1* | 3/2007 | Wong | G06F 17/30575 |
| 2007/0180239 A1 | 8/2007 | Fujibayashi et al. | |
| 2007/0226438 A1* | 9/2007 | Erofeev | G06F 11/1456 711/162 |
| 2008/0177964 A1* | 7/2008 | Takahashi | G06F 11/1466 711/162 |
| 2008/0184068 A1 | 7/2008 | Mogi et al. | |
| 2009/0037682 A1* | 2/2009 | Armstrong | G06F 12/1475 711/164 |
| 2009/0094413 A1* | 4/2009 | Lehr | G06F 3/0605 711/112 |
| 2009/0094425 A1* | 4/2009 | Winokur | G06F 11/2082 711/161 |
| 2009/0228648 A1* | 9/2009 | Wack | G06F 11/1092 711/114 |
| 2009/0271472 A1* | 10/2009 | Scheitler | G06F 9/485 709/202 |
| 2009/0282101 A1* | 11/2009 | Lim | G06F 9/5077 709/203 |
| 2009/0313503 A1* | 12/2009 | Atluri | G06F 11/1453 714/19 |
| 2010/0046267 A1* | 2/2010 | Yan | G11C 16/24 365/51 |
| 2010/0050016 A1* | 2/2010 | Franklin | G06F 11/0727 714/6.32 |
| 2010/0106926 A1* | 4/2010 | Kandasamy | G06F 12/1458 711/163 |
| 2010/0125712 A1* | 5/2010 | Murase | G06F 11/1458 711/162 |
| 2010/0332479 A1* | 12/2010 | Prahlad | G06F 17/302 707/741 |
| 2010/0332780 A1* | 12/2010 | Furuya | G06F 3/0689 711/162 |
| 2011/0066668 A1* | 3/2011 | Guarraci | G06F 17/30233 707/831 |
| 2011/0154103 A1* | 6/2011 | Bulusu | G06F 11/1658 714/6.23 |
| 2011/0202735 A1* | 8/2011 | Kono | G06F 11/1451 711/162 |
| 2011/0276578 A1 | 11/2011 | Allalouf et al. | |
| 2011/0307745 A1* | 12/2011 | McCune | G06F 17/30221 714/54 |
| 2012/0131232 A1* | 5/2012 | Brownlow | G06F 13/4221 710/10 |
| 2012/0198107 A1* | 8/2012 | McKean | G06F 13/18 710/40 |
| 2013/0007373 A1* | 1/2013 | Beckmann | G06F 12/126 711/136 |
| 2013/0046949 A1* | 2/2013 | Colgrove | G06F 3/0608 711/170 |
| 2013/0055253 A1* | 2/2013 | Jubran | G06F 9/455 718/1 |
| 2013/0067161 A1* | 3/2013 | Chandra | G06F 13/12 711/114 |
| 2013/0080805 A1* | 3/2013 | Vick | G06F 8/4432 713/320 |
| 2013/0086268 A1* | 4/2013 | Sloma | G06F 9/455 709/226 |
| 2013/0111129 A1* | 5/2013 | Maki | G06F 3/0611 711/117 |
| 2013/0152097 A1* | 6/2013 | Boctor | G06F 9/505 718/103 |
| 2013/0326270 A1* | 12/2013 | Chen | G06F 11/2089 714/6.21 |
| 2014/0003114 A1* | 1/2014 | Pellizzer | H01L 27/2481 365/63 |
| 2014/0201142 A1 | 7/2014 | Varadharajan et al. | |
| 2014/0222971 A1 | 8/2014 | Cooper et al. | |
| 2015/0248308 A1 | 9/2015 | Little | |
| 2016/0147614 A1 | 5/2016 | Mittal et al. | |

* cited by examiner

DATA GAP MANAGEMENT IN A REMOTE DATA MIRRORING SYSTEM

CROSS-REFERENCE TO RELATED APPLICATIONS

This application is a continuation of U.S. patent application Ser. No. 13/382,926, filed Jan. 8, 2012, in the national phase of PCT Patent Application PCT/IB2010/053427, filed Jul. 28, 2010, which claims the benefit of U.S. Provisional Patent Application 61/231,025, filed Aug. 4, 2009, whose disclosure is incorporated herein by reference.

FIELD OF THE INVENTION

The present invention relates generally to data protection systems, and particularly to methods and systems for protecting mirrored data against disaster events using disaster-proof storage devices.

BACKGROUND OF THE INVENTION

Various methods and systems are known in the art for protecting data in computer systems against disasters such as earthquakes, storms, floods, fires and terrorist attacks. Some solutions involve replicating (mirroring) the data in a primary and a secondary storage device.

For example, PCT International Publication WO 2006/111958 A2, whose disclosure is incorporated herein by reference, describes a method and system for data protection that includes accepting data for storage from one or more data sources. The data is sent for storage in a primary storage device and in a secondary storage device. While awaiting an indication of successful storage of the data in the secondary storage device, a record associated with the data is temporarily stored in a disaster-proof storage unit adjacent to the primary storage device. When an event damaging at least some of the data in the primary storage device occurs, the data is reconstructed using the record stored in the disaster-proof storage unit and at least part of the data stored in the secondary storage device.

SUMMARY OF THE INVENTION

An embodiment of the present invention that is described herein provides a method for data protection, including:

monitoring a sequence of transactions that modify data in one or more volumes, wherein the transactions are transferred from one or more data sources to a primary storage in a given order and are replicated to a secondary storage, and wherein the one or more volumes belong to a volume group for which the transactions are guaranteed to be replicated to the secondary storage while retaining the given order;

periodically issuing artificial write transactions to a protection application field, which is predefined in a given volume belonging to the volume group, so as to insert the artificial write transactions into the sequence;

storing respective records indicative of the transactions of the sequence, including the artificial write transactions, in a disaster-proof storage unit, in order to enable reconstruction of at least part of the data of the volume group using at least a portion of the data that is replicated in the secondary storage device and at least some of the records that are stored in the disaster-proof storage unit upon occurrence of an event that affects data storage in the primary storage; and upon verifying that a given artificial write transaction has been successfully replicated in the secondary storage, deleting from the disaster-proof storage unit the records corresponding to the given artificial write transaction and the transactions that precede the given artificial write transaction in the sequence.

In some embodiments, verifying that the given artificial write transaction has been successfully replicated includes periodically reading the artificial write transactions from the secondary storage. In an embodiment, periodically reading the artificial write transactions includes modifying a period of time between consecutive reading operations of the artificial write transactions in real time. In another embodiment, the volume group includes a consistency group.

In a disclosed embodiment, issuing the artificial write transactions includes assigning the artificial write transactions respective unique values. In an embodiment, the unique values include serial indices. In an alternative embodiment, the unique values include time stamps. In another embodiment, verifying that the given artificial write transaction has been successfully replicated includes reading a unique value of the given artificial write transaction, and verifying that the read unique value is different from a previously-read unique value. In yet another embodiment, periodically issuing the artificial write transactions includes modifying a period of time between consecutive artificial write transactions in real time. In still another embodiment, the protection application field is included in a dedicated protection application volume that belongs to the volume group.

There is additionally provided, in accordance with an embodiment of the present invention, a data protection apparatus, including:

an interface for monitoring a sequence of transactions that modify data in one or more volumes, wherein the transactions are transferred from one or more data sources to a primary storage in a given order and are replicated to a secondary storage, and wherein the one or more volumes belong to a volume group for which the transactions are guaranteed to be replicated to the secondary storage while retaining the given order; and a processor, which is configured to periodically issue artificial write transactions to a protection application field that is predefined in a given volume belonging to the volume group so as to insert the artificial write transactions into the sequence, to store respective records indicative of the transactions of the sequence, including the artificial write transactions, in a disaster-proof storage unit, and to delete from the disaster-proof storage unit, upon verifying that a given artificial write transaction has been successfully replicated in the secondary storage, the records corresponding to the given artificial write transaction and the transactions that precede the given artificial write transaction in the sequence.

The present invention will be more fully understood from the following detailed description of the embodiments thereof, taken together with the drawings in which:

DETAILED DESCRIPTION OF EMBODIMENTS

Overview

Figure 1:
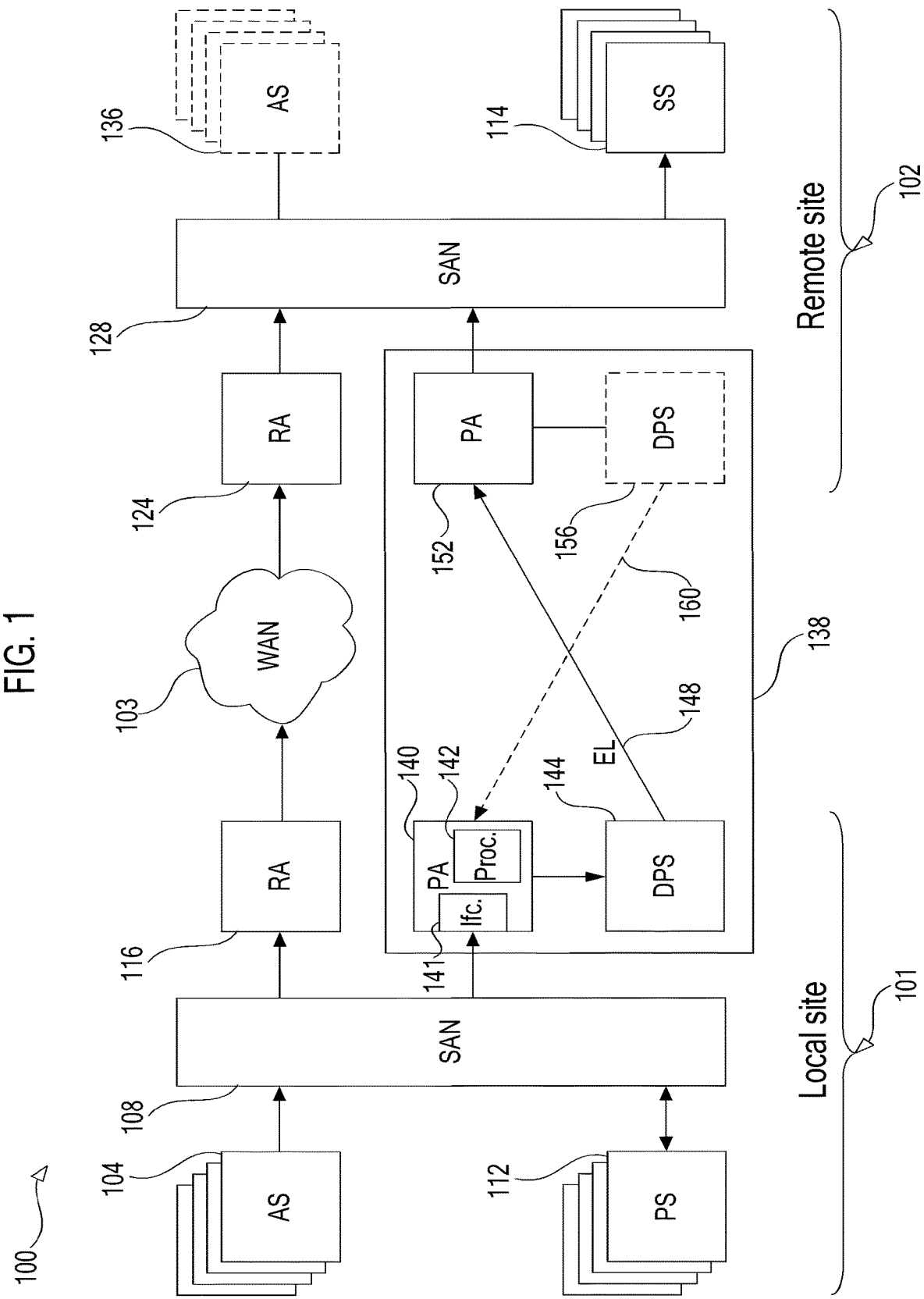
FIG. 1 is a block diagram that schematically illustrates a data center, in accordance with an embodiment of the present invention.

Embodiments of the present invention provide improved methods and devices for protecting data through a disaster by storing it in a Disaster-Proof temporary Storage device (DPS). A typical environment in which the disclosed techniques are embodied comprises a system, where one or more Application Servers (ASs) issue transactions that modify data in one or more Primary Storage (PS) volumes through a Storage Area Network (SAN). A typical example of such a system is a Data Center (DC). The transactions may include writing data to the PS and/or deleting data from it. The PS comprises a group of one or more volumes, either virtual or physical, designated a "volume group", which are mirrored in a Secondary Storage (SS) device. Typically, the PS is located in a local site and the SS is located in a remote site.

A volume group is characterized by a "sequence integrity" property, meaning that for any given sequence of transactions that are applied to the volume group, the order of transactions in the PS is guaranteed to be retained in the SS. A typical example of such a volume group is a Consistency Group (CG), wherein the volumes are managed as a single entity whose secondary images always remain in a consistent and restartable state with respect to their primary image and each other, up to a defined permissible time lag. The mirroring is performed by a Replication Appliance (RA) that is connected to the SAN and constantly sends a replica of the transactions that pertain to the CG over to the SS, typically over a Wide-Area Network (WAN).

A Protection Appliance (PA) simultaneously transfers the above transactions to a DPS that is located in the local site. Typically, the content of the DPS is organized in an indexed sequential access log. The sequential order of the transactions in the log reflects the order in which those transactions have been written to the PS, which is equal to the order of their writing to the SS, as stems from the sequence integrity property.

Later, should a disaster event occur that damages the operation of the DC, thus affecting the data storage in the PS, the DPS would transmit to the SS the most recent transactions that are stored in it and are assessed to be missing in the SS. The DPS uses for this transmission an Emergency Link (EL), which sometimes comprises several communication alternatives. The recovered transactions are then merged at the SS with the transactions that have been replicated to the SS prior to the disaster event, so that the secondary CG would exactly reflect the content of the primary CG prior to the disaster event.

The PA application software constantly determines the amount of recent transactions that shall be recovered should a disaster event occur. This determination is based on an assessment of the amount of transaction data that has been already written to the PS but its writing to the SS has not been confirmed yet. This amount is herein denoted Data Gap (DG). DG is comprised, at any given moment, of the transaction data that is accumulated in the RA buffers, and of a typically small amount of data that is accumulated within the PS-to-SS link. The latter data gap component is called in this disclosure "communication DG". The DG is approximately equal to the difference between the CG transaction data that has been synchronously applied to the PS and its corresponding asynchronous replication within the SS. Embodiments of the present invention provide methods and systems for assessing DG with high accuracy.

In many cases the remote site is planned to serve as a backup DC for the local DC, should it fails to operate. Moreover, a reliable and instant application failover between the sites is sometimes desired. A necessary condition for a reliable failover is to avoid data discrepancy between the PS and the SS, hence, the assessed DG should not be smaller than the actual DG. In addition, for providing an instant failover, the assessed DG should be as close as possible to the actual DG in order to minimize the DG recovery time. This feature is advantageous, for example, when the EL comprises a narrow bandwidth link that includes an omni-directional wireless transmission from the DPS.

In a typical embodiment of the present invention, a new protection application volume, denoted $V_{PA}$, is added to the CG in order to assess the DG. $V_{PA}$ instances in the PS and in the SS are denoted primary $V_{PA}$ and secondary $V_{PA}$ respectively. $V_{PA}$ comprises a protection application field, which is dedicated for the purpose of accurate DG assessment. A typical embodiment comprises creation of $V_{PA}$ through a configuration management of the data storage system. In some alternative embodiments, the PA creates the protection application field, either within one of the volumes that belong to the volume group or within a dedicated virtual volume that the PA creates.

The PA manages $V_{PA}$ as follows: It periodically issues artificial write transactions to the $V_{PA}$ so as to insert them into the transaction sequence that pertains to the CG. Each $V_{PA}$ related transaction contains a record, denoted R, to which the PA assigns a respective unique value. Each record that pertains to the series R is denoted herein R as well for the simplicity. Each new record that is written to $V_{PA}$ updates the $V_{PA}$ protection application field, hence this field always reflects the last R unique value that the PA wrote to $V_{PA}$. The inter-record period of R (i.e., the time interval between writing successive records R) is denoted Tw. R is written and stored within the DPS, as well as within the SS, in the same manner as the data of the other volumes that pertain to the CG.

In addition to the above writing process of R, the PA also manages a reading process wherein it constantly reads the content of the secondary $V_{PA}$, i.e., the last R unique value that was written in the SS. Reading a new R value from the SS constitutes a confirmation for the PA that this R, as well as all the transactions that pertain to the CG and precede that R, have been already written successfully to the SS. This confirmation stems from the sequence integrity property of the CG. Consequently, the PA would delete the corresponding R from the DPS log, together with the log stored transactions that preceded it, since those transactions will not be needed for recovery. This deletion procedure limits the DPS content size to the real DG size plus an assessment error. The maximal assessment error is approximately equal to the amount of data that is written to the PS during Tw+Trt, where Trt denotes the round trip delay toward the SS. As Tw may be set as small as Trt the assessment error is approximately equal to the communication DG size.

In addition to the achieved DG assessment accuracy, the above method is a RA-independent mechanism, and therefore allows for an easy integration of a DG management and recovery system that comprises a PA and a DPS, as described above, in a DC that already comprises a mirroring system.

Embodiments of the present invention are in no way limited to data centers, and may be used in other environments, e.g. in data acquisition sites and in surveillance centers. The disclosed techniques are also applicable to storage volumes that are not necessarily arranged as CG, e.g. wherein there is no dependency between the transactions that pertain to the different volumes in the group, provided that the transaction ordering in the PS is always retained in the SS.

System Description

FIG. 1 is a block diagram that schematically illustrates a data storage system 100, in accordance with an embodiment of the present invention. System 100 comprises a local site 101 and a remote site 102, which are interconnected by a WAN 103. The illustrated WAN represents any communication means that can be used, in different example embodiments, to interconnect the above sites, e.g., an Internet Protocol (IP) network, a point to point link or a Fibre Channel based network. Local site 101 comprises a Data Center (DC) wherein one or more Application Servers (ASs) 104 issue transactions to one or more Primary Storage (PS) devices 112. Storage Area Network (SAN) 108 transfers the transactions to the storage. SAN 108 comprises, in typical embodiments of the present invention, one or more Fibre Channel switches. In alternative example embodiments, the SAN may be based on Internet Small Computer System Interface (iSCSI). Yet in other embodiments SAN 108 may represent the attachment of one or more Network Attached Storage (NAS) devices to ASs 104.

PS 112 typically comprises one or more volumes, either virtual or physical, that are arranged as a Consistency Group (CG). The CG is mirrored to a Secondary Storage (SS) 114 that is located at remote site 102. The mirroring is performed by a Replication Appliance (RA) 116 that is connected to SAN 108 and constantly sends a replica of all the transactions that pertain to the CG, over WAN 103, to a counterpart replication appliance RA 124. In some embodiments, specific replication software agents within ASs 104 generate the transactions' replica and transfer it to RA 116 through SAN 108. In alternative embodiments SAN 108 is configured to generate this replica and to provide it to RA 116 through a dedicated port. In further alternative embodiments RA 116 is not resorted to and ASs 104 communicate with remote site 102 directly. In further alternative embodiments, the replication is performed directly from PS 112 to SS 114.

Remote RA 124 is typically configured to extend the transactions coming from RA 116 over a remote SAN 128, which transfers the transactions to SS 114. A Protection Appliance (PA) 140 simultaneously receives yet another replica of the CG related transactions. PA 140 comprises an interface 141 for communicating with SAN 108. PA 140 also comprises a processor 142 which executes the logical operations of the PA. PA 140 directly transfers the above transactions to a Disaster-Proof Storage device (DPS) 144. In an alternative embodiment, PA 140 communicates with DPS 144 via SAN 108 and interface 141. The DPS is configured to store the transactions that PA 140 writes to it in a log that is organized in indexed sequential access manner. The sequential order of the transactions in the log reflects the order in which those transactions have been written to PS 112, which is equal to the order of their writing to SS 114, as stems from the sequence integrity property of CGs.

DPS 144 is configured to sense a major failure of local site 101, which may happen through a disaster event and would affect the data storage in the PS. Should such failure occur DPS 144 would transmit to SS 114 the most recent transactions that are stored in it and are assessed to be missing in the SS. DPS 144 uses for this transmission an Emergency Link (EL) 148, which typically comprises several communication alternatives. In typical embodiments, one of these alternatives would be an omni-directional wireless transmission. EL 148 passes the recovered transactions to a counterpart PA 152 at the remote site, which applies them to SS 114 through SAN 128, either directly or via RA 124. The recovered transactions complement the transactions that were replicated to the SS prior to the disaster event, so that the secondary CG would exactly reflect the content of the primary CG prior to the disaster event.

In some embodiments, the remote site comprises another DPS 156, e.g., when site 102 operates as an active DC that comprises optional ASs 136, such that storage 112 serves as a mirroring medium for storage 114. Should the DC in site 102 fail due to a disaster event, DPS 156 would recover the transactions to storage 114 that are missing in storage 112 through an EL 160.

The configuration of system 100 shown in FIG. 1 is an example configuration, which is chosen purely for the sake of conceptual clarity. PS 112 and SS 114 may comprise any suitable type of storage device, such as magnetic disks or solid-state memory units. System elements that are not mandatory for understanding the disclosed techniques were omitted from the figure for the sake of clarity. In alternative embodiments, other system configurations can also be used. For example, RA 116 may write to SS 114 via WAN 103 and SAN 128, without the mediation of RA 124. In other alternative embodiments PS 112 may comprise multiple CGs that may be mirrored to SS 114 or to multiple remote sites.

In some embodiments, the functions of PA 140 are implemented in software running on a suitable processor. In alternative embodiments, some or all of the functions of PA 140 can be implemented in hardware, or using a combination of hardware and software elements. In some embodiments, PA 140 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. Further aspects regarding the operation of PA 140, and data storage using disaster-proof storage devices in general, are addressed in PCT International Publication WO 2006/111958, cited above.

Logical System Operation

Figure 2:
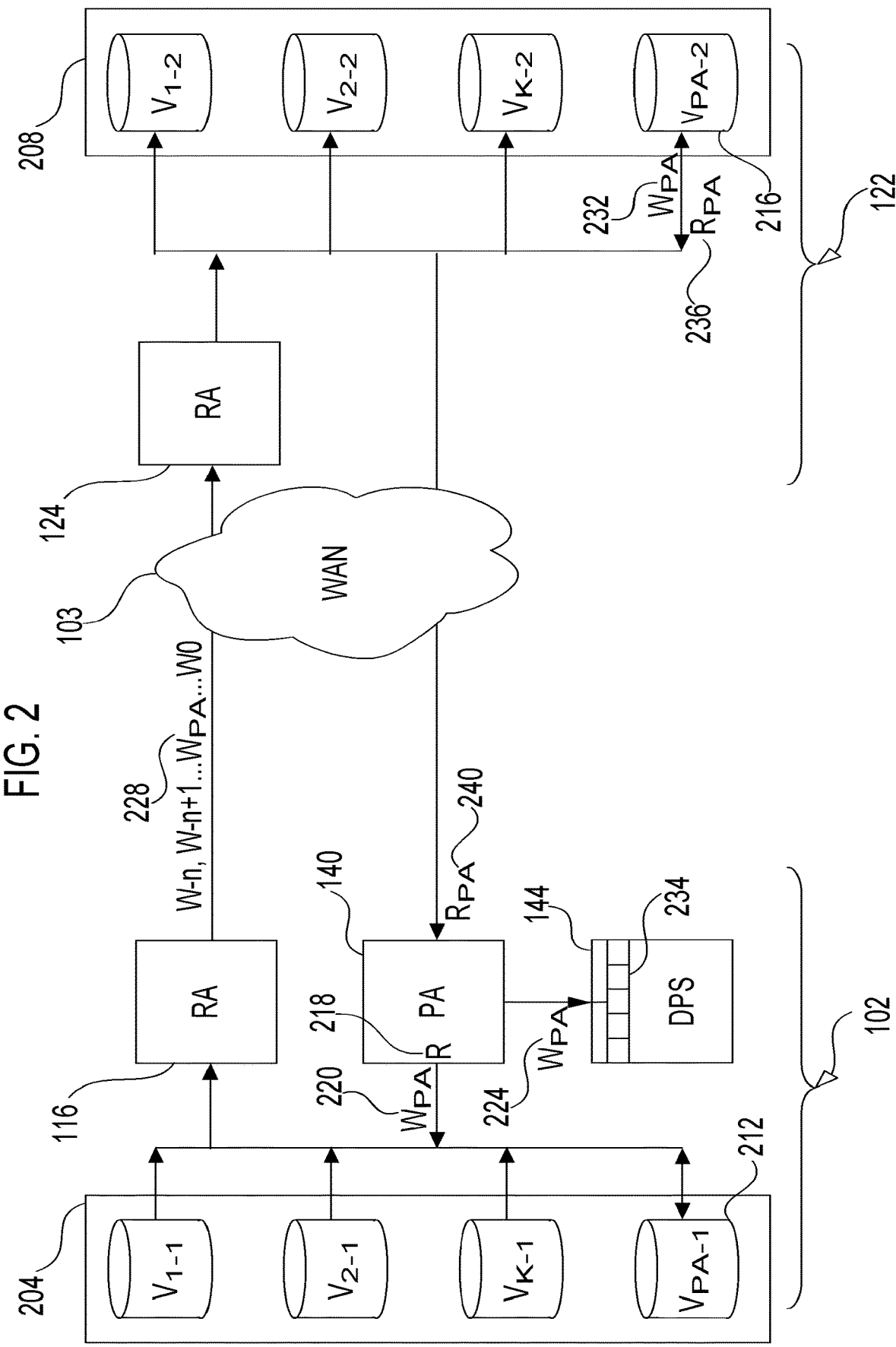
FIG. 2 is a block diagram that schematically illustrates the operation of an embodiment of the present invention.

FIG. 2 is a block diagram that schematically illustrates the operation principles of an embodiment of the present invention. A group of virtual volumes $V_{1-1}$, $V_{2-1}$, ... $V_{k-1}$ and $V_{PA-1}$ 212 constitutes a CG whose primary instance is denoted CG 204 and is stored in PS 112. RA 116 constantly replicates CG 204 to remote site 102 through WAN 103. Within the remote site, RA 124 receives the replicated transactions that pertain to the CG and copies them to virtual volumes $V_{1-2}$, $V_{2-2}$, ... $V_{k-2}$ and $V_{PA-2}$ 216 respectively, thus forming a mirrored CG 208 in SS 114. $V_{PA}$, which is the general notation of $V_{PA-1}$ and $V_{PA-2}$, comprises a single record, which PA 140 manages as follows:

PA 140 generates a periodical series of serially indexed records, denoted R 218, and writes it in a series of transactions $W_{PA}$ 220 to $V_{PA-1}$ 212. For the sake of simplicity, R 218 denotes the series of records as well as each separate record that pertains to this series. The main content of record R is its running index. As $V_{PA}$ comprises a single record, each new $W_{PA}$ 220 tramples the previously stored one. Immediately after writing $W_{PA}$ 220 to $V_{PA-1}$ 212, PA 140 receives a replica of $W_{PA}$ 220, as explained above, and writes it as $W_{PA}$ 224 to DPS 144. RA 116 receives a replica of $W_{PA}$ 220 as well, and combines it as $W_{PA}$ 228 within a transaction sequence . . . W-n, W-n+1, . . . $W_{PA}$, . . . W0 that it replicates to remote site 102 over WAN 103. In this sequence, all the transactions that have been written to CG 204 prior to $W_{PA}$ 228 will be replicated to CG 208 prior to $W_{PA}$ 228 as well, as stems from the sequence integrity property of CGs. RA 124 receives the above record sequence and copies it to CG 208. In particularly it writes $W_{PA}$ 232 record series to $V_{PA-2}$ within CG 208.

PA 140 also manages, within DPS 144, a sequential list 234 that contains the R records that it has recently written to the DPS. Each list 234 entry contains also a pointer to the corresponding R record in the log.

Concurrently with the above writing process of $W_{PA}$, PA 140 is configured to constantly read, typically over WAN 103, the content of $V_{PA-2}$ 216, in a read transaction $R_{PA}$ 236. PA 140 receives $R_{PA}$ 236 through the WAN as $R_{PA}$ 240 and checks its index. Upon reading a new $R_{PA}$ index, PA 140 deletes the following data that is stored in DPS 144: The corresponding entry in list 234, the $W_{PA}$ entry that it has pointed in the log and all the log entries that have preceded that $W_{PA}$. PA 140 can safely delete the above data due to the fact that replication of that data to CG 208 has been actually confirmed by the above new $R_{PA}$ index.

The deletion would leave in DPS 144 only the necessary transactions for recovery, should a disaster event occur, thus shortening later recovery time through EL 148. This amount of transactions is an assessment of the difference, at any given moment, between CG 204 and CG 208, which is called "Data Gap" (DG). In alternative embodiments, DPS 144 is arranged to manage list 234 and the above deletion process according to information regarding new $R_{PA}$ 240 indices, which PA 140 constantly conveys to DPS 144.

DG Assessment Method

Figure 3:
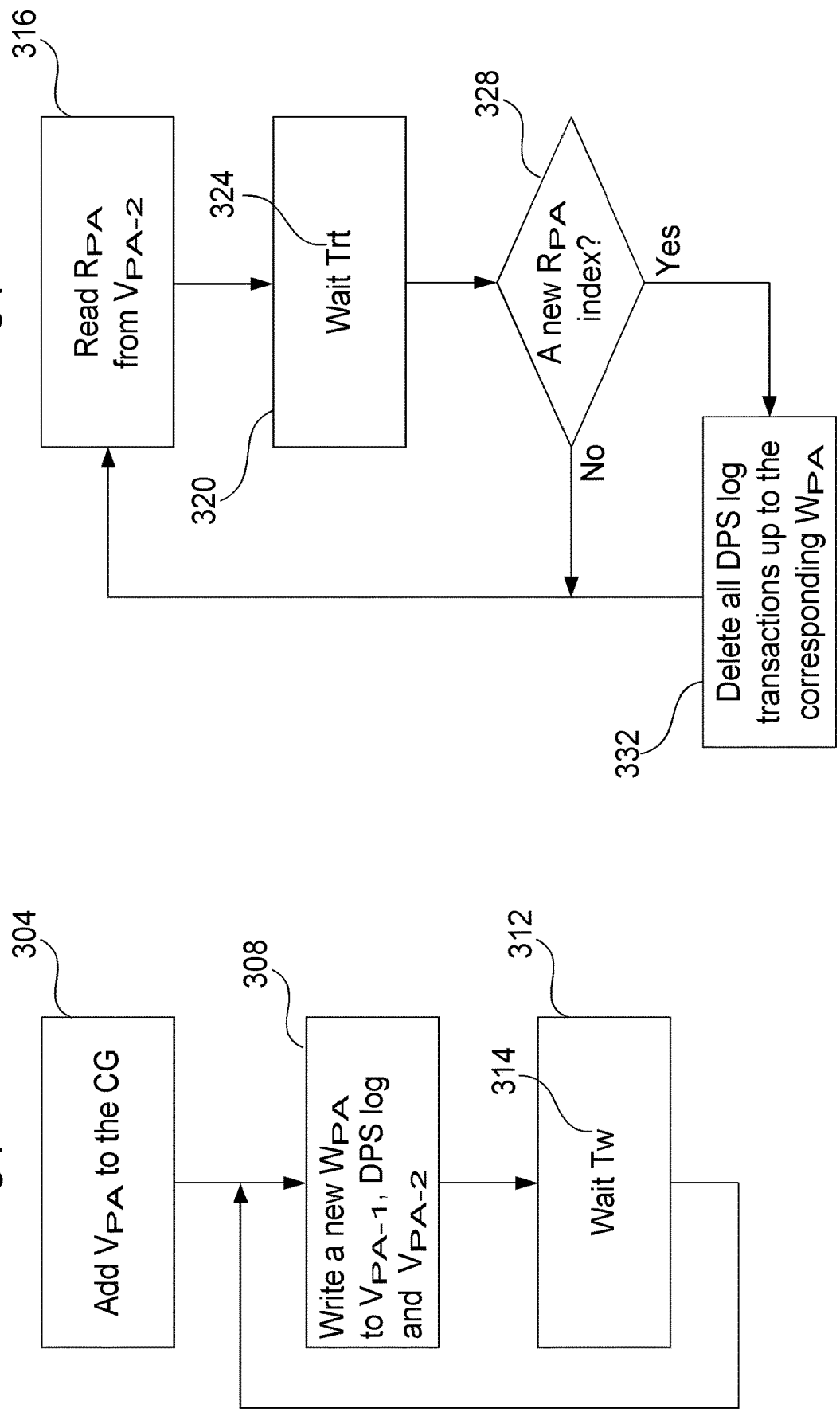
FIGS. 3A and 3B are flowcharts that schematically illustrate a method for disaster-proof storage management, in accordance with an embodiment of the present invention.

FIG. 3A is a flowchart that schematically illustrates the writing part of a method for DG assessment and for managing DPS 144 content, in accordance with an embodiment of the present invention. The method begins by adding a virtual volume $V_{PA}$ to a consistency group CG, at an adding $V_{PA}$ step 304. This adding step demonstrates an option to integrate the disclosed techniques into an existing DC. In other embodiments of the present invention, wherein a mirrored CG comprises $V_{PA}$ when it is established, step 304 may be redundant. In a $W_{PA}$ writing step 308, PA 140 writes a serially indexed record R in transaction $W_{PA}$ 220 to $V_{PA-1}$ 212. DPS 144 receives a replica of $W_{PA}$ 220, denoted $W_{PA}$ 224. RA 124 writes a second replica of $W_{PA}$ 220, denoted $W_{PA}$ 232, to secondary $V_{PA-2}$ 216. In a wait Tw step 312, PA 140 waits a period Tw 314 and resumes step 308, thus forming a series of transactions $W_{PA}$.

FIG. 3B is a flowchart that schematically illustrates the reading part of a method for DG assessment and for managing DPS 144 content, in accordance with an embodiment of the present invention. This part of the method begins with a read $R_{PA}$ 316 step, wherein local PA 140 issues a read transaction, denoted $R_{PA}$, for checking the actual $V_{PA-2}$ index at remote CG 208. PA 140 waits for the arrival of the read index in a wait Trt step 324, wherein Trt denotes the round trip delay of the $R_{PA}$ read transaction. PA 140 is configured to make the following decision, in a decision step 328, according the received $R_{PA}$ index: If the index value has not been changed relative to the previous read index then PA 140 would resume step 316. If the index value is a new one, then PA 140 assumes a deletion step 332. In deletion step 332 PA 140 deletes all DPS 144 log transactions that precede the stored $W_{PA}$, whose index is the same as the newly read index, including that $W_{PA}$. PA 140 resumes step 316 after the deletion.

Figure 4:
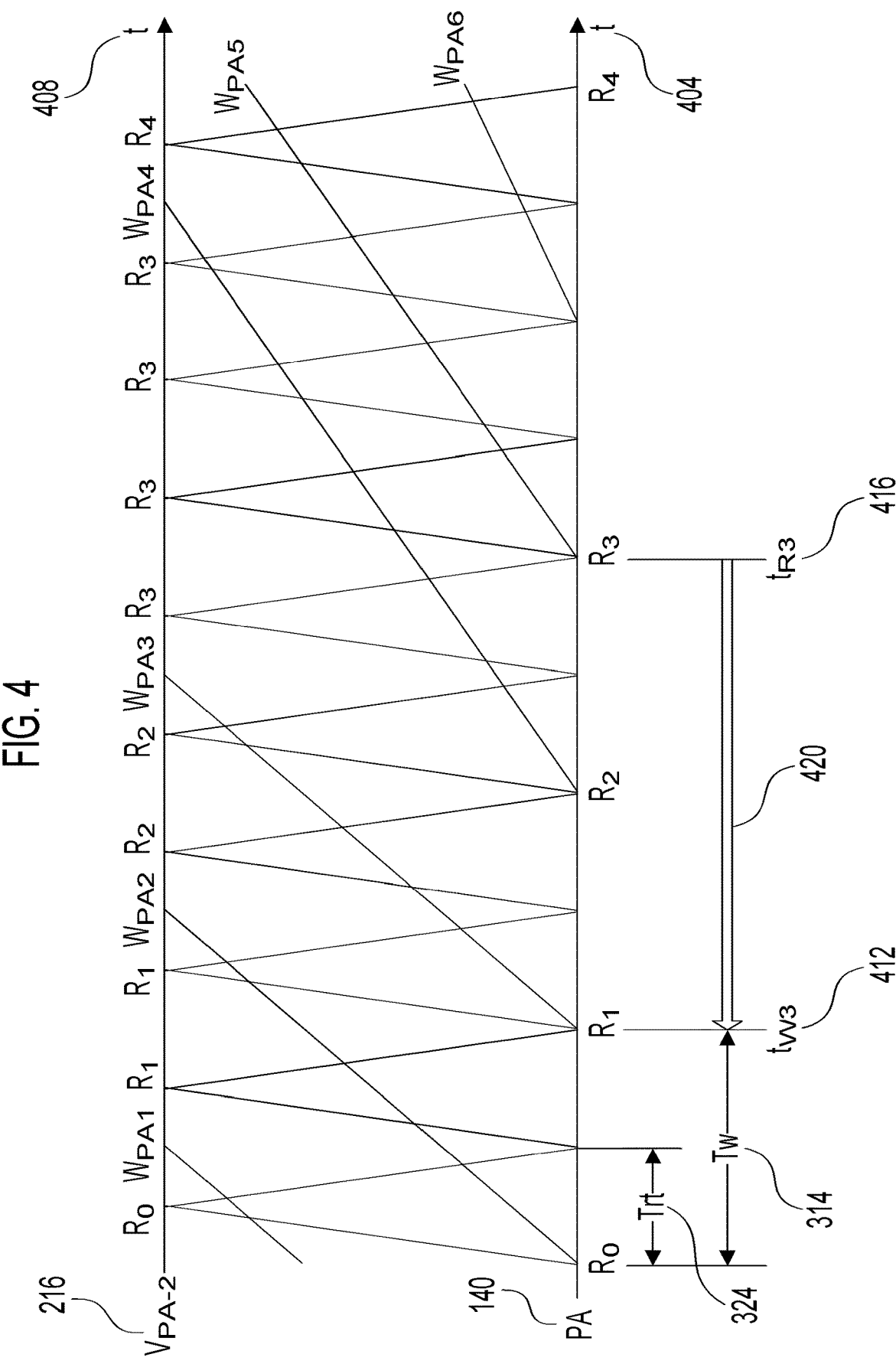
FIG. 4 is a timing diagram that schematically illustrates a method for data gap assessment, in accordance with an embodiment of the present invention.

FIG. 4 is a timing diagram that schematically illustrates a method for DG assessment, in accordance with an embodiment of the present invention. A time axis 404 illustrates $V_{PA}$ related events that occur over time in PA 140. PA 140 issues transactions $W_{PA1}$, $W_{PA2}$, . . . to $VA_{PA-2}$ 216 with inter-transaction period Tw 314. Tw 314 is set as twice the value of the round trip delay toward SS 114, denoted Trt 324. In alternative embodiments, Tw may be set as small as Trt for minimizing the DG assessment error to the communication DG size over the WAN. PA 140 concurrently issues read transactions from $V_{PA-2}$ 216 with inter-transaction period Trt 314.

In FIG. 4 those transactions are illustrated in terms of the actual $V_{PA-2}$ record indices that PA 140 reads. These indices are denoted $R_0$, $R_1$, . . . $R_4$ on a time axis 408. PA 140 receives each read index Trt seconds after the issuance of the read transaction. The read indices are denoted on time axis 404, wherein indices that are not new are omitted. In alternative embodiments, PA 140 software identifies the $W_{PA}$ records with timestamps instead of running indices.

PA 140 managing the transaction log within DPS 144 is exemplified in the following example: PA 140 issues in a time $t_{w3}$ 412 a transaction $W_{PA3}$. PA 140 receives $W_{PA3}$'s index R3 the first time at a time instance $t_{R3}$ 416. PA 140 then deletes all the transactions that have been stored in DPS 144 log before $W_{PA3}$, including $W_{PA3}$ itself. This deletion action is illustrated in FIG. 4 by a double arrow 420. In alternative embodiments, indices R3 are substituted by time stamps or using any other suitable type of unique values that assigned to the artificial write transactions. Yet in other alternative embodiments, the read transaction period is adjusted to be larger than Trt in order to save overhead throughput over WAN 103. On the other hand, the inter-transaction periods of $W_{PA}$ 220 and $R_{PA}$ 236 are typically limited in order to minimize the DG assessment error.

In further alternative embodiments, PA 140 adjusts, in real time, the $W_{PA}$ 220 and $R_{PA}$ 236 inter-transaction periods as follows: The PA limits the overall $W_{PA}$ and $R_{PA}$ throughput so as to ensure a minimal impact on the actual replication throughput through WAN 103. In addition, the PA limits Tw 314 magnitude so that at any given moment the actual total writing amount to CG 204 during Tw would be much smaller than the overall content size within DPS 144. Yet in further alternative embodiments of the present invention PA 140 may set, either in software or in hardware or in a combination thereof, any other suitable combination of $W_{PA}$ 220 and $R_{PA}$ 236 inter-transaction periods. These combinations may rely on predetermined values of relevant factors like Trt, overall writing throughput to CG 204 and the effective throughput through WAN 103. These values may alternatively be determined in real time, and affect the chosen combination accordingly.

Although in the embodiments described herein the DG assessment and DPS management mechanism is implemented externally to RAs 116 and 124, they can alternatively be implemented within the RAs thus saving separate PAs 140 and 152.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An apparatus for data protection, comprising:
a data storage device; and
an appliance, which is configured to:
   (i) communicate via a storage area network (SAN) with a first group of primary storage volumes, to which data storage transactions are applied via the SAN by local servers, and communicate via a wide area network (WAN) with a second group of backup storage volumes, to which ordered series of the data storage transactions are replicated;
   (ii) periodically write, via the SAN, a sequence of indexed transactions to a protection application field, which is dedicated in one of the primary storage volumes for assessment of a data gap (DG) between the primary storage volumes and the backup storage volumes, whereby the indexed transactions are replicated within the ordered series of the data storage transactions to a corresponding one of the backup storage volumes;
   (iii) store respective records of the transactions in the ordered series in the data storage device while maintaining order of the series; and
   (iv) periodically read, via the WAN, the indexed transactions from the corresponding one of the backup storage volumes and, upon reading a given indexed transaction from among the indexed transactions that were replicated to the one of the backup storage volumes, erase from the data storage device all of the records of the transactions that preceded the given indexed transaction in the ordered series.

2. The apparatus according to claim 1, wherein the one of the primary storage volumes, which is written to and read from by the processor, is dedicated for access by the appliance.

3. The apparatus according to claim 1, wherein the first group of primary storage volumes comprises a consistency group.

4. The apparatus according to claim 1, wherein the appliance is configured to modify, in real time, a period of time between consecutive reading operations of the indexed transactions from the one of the backup storage volumes.

5. The apparatus according to claim 1, wherein the appliance is configured to modify, in real time, a period of time between consecutive writing operations of the indexed transactions to the one of the primary storage volumes.

6. The apparatus according to claim 1, wherein the appliance is configured to index the transactions in the sequence with respective serial indices or time stamps.

7. The apparatus according to claim 1, wherein, upon reading the given indexed transaction, the appliance is configured to verify that an index of the given indexed transaction differs from the index of a previously-read indexed transaction.

8. The apparatus according to claim 1, wherein the appliance is configured to write and read the indexed transactions independently of any coordination with a replication scheme used for replicating the ordered sequence.

9. The apparatus according to claim 1, wherein the data storage device is disaster-proof.

10. A method for data protection, comprising:
using an appliance, communicating via a storage area network (SAN) with a first group of primary storage volumes, to which data storage transactions are applied via the SAN by local servers, and communicating via a wide area network (WAN) with a second group of backup storage volumes, to which ordered series of the data storage transactions are replicated;
periodically writing, by the appliance, via the SAN, a sequence of indexed transactions to a protection application field, which is dedicated in one of the primary storage volumes for assessment of a data gap (DG) between the primary storage volumes and the backup storage volumes, whereby the indexed transactions are replicated within the ordered series of the data storage transactions to a corresponding one of the backup storage volumes;
storing, by the appliance, respective records of the transactions in the ordered series in a data storage device while maintaining order of the series;
periodically reading, by the appliance, via the WAN, the indexed transactions from the corresponding one of the backup storage volumes; and
upon reading a given indexed transaction from among the indexed transactions that were replicated to the one of the backup storage volumes, erasing, by the appliance, from the data storage device all of the records of the transactions that preceded the given indexed transaction in the ordered series.

11. The method according to claim 10, wherein the one of the primary storage volumes, which is written to and read from by the appliance, is dedicated for access by the protection appliance.

12. The method according to claim 10, wherein the first group of primary storage volumes comprises a consistency group.

13. The method according to claim 10, wherein reading the indexed transactions comprises modifying, in real time, a period of time between consecutive reading operations of the indexed transactions from the one of the backup storage volumes.

14. The method according to claim 10, wherein writing the indexed transactions comprises modifying, in real time, a period of time between consecutive writing operations of the indexed transactions to the one of the primary storage volumes.

15. The method according to claim 10, wherein writing the sequence comprises indexing the transactions in the sequence with respective serial indices or time stamps.

16. The method according to claim 10, and comprising, upon reading the given indexed transaction, verifying that an index of the given indexed transaction differs from the index of a previously-read indexed transaction.

17. The method according to claim 10, wherein writing and reading the indexed transactions are performed independently of any coordination with a replication scheme used for replicating the ordered sequence.

18. The method according to claim 10, wherein the data storage device is disaster-proof.

* * * * *